United States Patent
Chang et al.

(10) Patent No.: US 10,935,514 B2
(45) Date of Patent: Mar. 2, 2021

(54) LOW POWER COMBUSTIBLE GAS SENSING

(71) Applicant: International Business Machines Corporation, Armonk, NY (US)

(72) Inventors: Josephine B. Chang, Ellicott City, MD (US); Talia S. Gershon, White Plains, NY (US); Supratik Guha, Chicago, IL (US); Hendrik F. Hamann, Yorktown Heights, NY (US); Jiaxing Liu, Westfield, NJ (US); Theodore G. van Kessel, Millbrook, NY (US)

(73) Assignee: International Business Machines Corporation, Armonk, NY (US)

(*) Notice: Subject to any disclaimer, the term of this patent is extended or adjusted under 35 U.S.C. 154(b) by 392 days.

(21) Appl. No.: 15/674,265

(22) Filed: Aug. 10, 2017

(65) Prior Publication Data
US 2019/0049403 A1    Feb. 14, 2019

(51) Int. Cl.
*G01N 27/407*    (2006.01)
*G01N 27/416*    (2006.01)

(52) U.S. Cl.
CPC ....... *G01N 27/4075* (2013.01); *G01N 27/416* (2013.01)

(58) Field of Classification Search
CPC ............ G01N 27/4075; G01N 27/416; G01N 27/4074
See application file for complete search history.

(56) References Cited

U.S. PATENT DOCUMENTS

| | | | |
|---|---|---|---|
| 4,591,414 A | 5/1986 | Zaromb et al. |
| 4,731,226 A | 3/1988 | Takahata et al. |
| 4,870,025 A | 9/1989 | Hurley et al. |
| 5,635,628 A | 6/1997 | Fleischer et al. |
| 5,767,388 A | 6/1998 | Fleischer et al. |
| 6,263,723 B1 | 7/2001 | Takao et al. |
| 6,429,167 B1 | 8/2002 | Maeno et al. |
| 6,682,837 B2 | 1/2004 | Gorer |
| 7,329,389 B2 | 2/2008 | Horovitz et al. |

(Continued)

FOREIGN PATENT DOCUMENTS

| JP | 2005098844 A | * | 4/2005 |
|---|---|---|---|
| JP | 2007248223 A | * | 9/2007 |

OTHER PUBLICATIONS

Machine translation of JP-2007248223-A, Muramoto et al. (Year: 2007).*

(Continued)

*Primary Examiner* — Mayla Gonzalez Ramos
(74) *Attorney, Agent, or Firm* — Rabin Bhattacharya; Michael J. Chang, LLC (57) ABSTRACT

Low power combustible gas sensors using a thermocouple design are provided. In one aspect, a combustible gas sensor includes: at least one first electrode; at least one second electrode formed from a dissimilar material from the first electrode; and a catalytic material at an active reaction junction between the first electrode and the second electrode, wherein the active reaction junction between the first electrode and the second electrode forms a thermocouple. A sensing device is including, e.g., multiple sensors, and a method for sensing combustible gas using the present sensors are also provided.

16 Claims, 8 Drawing Sheets

(56) References Cited

U.S. PATENT DOCUMENTS

| | | | |
|---|---|---|---|
| 8,088,333 | B2 | 1/2012 | Ahmad |
| 8,691,609 | B1 | 4/2014 | Smith et al. |
| 2002/0017461 | A1* | 2/2002 | Kunimoto .......... G01N 27/4075 204/424 |
| 2004/0112764 | A1* | 6/2004 | Stokes .............. G01N 33/2841 205/782 |
| 2007/0212263 | A1* | 9/2007 | Shin ..................... G01N 27/16 422/95 |
| 2013/0072738 | A1 | 3/2013 | Jung et al. |
| 2014/0266748 | A1 | 9/2014 | Wong |

OTHER PUBLICATIONS

Machine translation of JP-2005098844-A, Sano. (Year: 2005).*
Safa Kasap, "Thermoelectric Effects in Metals: Thermocouples," An e-Booklet, pp. 1-11 (Nov. 2001).
Singh et al., "Review: An Overview of Recent Development of Platinum-Based Cathode Materials for Direct Methanol Fuel Cells," Int. J. Electrochem. Sci., 9 (Jul. 2014) 5607-5639.
L.N. van Rij et al., "Detection of methane in oxygen-poor atmospheres using a catalytic asymmetric sensor design," Sensors and Actuators B, vol. 75, No. 1, Apr. 2001, pp. 111-120.

* cited by examiner

LOW POWER COMBUSTIBLE GAS SENSING

FIELD OF THE INVENTION

The present invention relates to gas sensing techniques, and more particularly, to low power combustible gas sensors using a thermocouple design.

BACKGROUND OF THE INVENTION

Combustible gas sensing is important to many industries and human activities ranging from home safety to mining operations. Methane sensing, for example, is particularly important to a number of subject areas including oil and gas operations, cattle ranching, greenhouse gas monitoring, natural gas monitoring, etc.

For such applications, many sensors need to be deployed over (often remote locations) for extended periods of time. Thus, it would be desirable to have a battery-powered sensor having a long lifetime (e.g., on the order of 5 years), with very low power consumption.

Existing combustion sensors, however, rely on electrical heating elements to operate the sensor element at high temperatures. These electrical heating elements typically consume prohibitively large amounts of power (on the order of from about 50 milliwatts (mW) to about 150 mW). Many commercial devices are further limited to high concentrations of gas.

Thus, a room temperature, low power consuming, and low cost sensor for the detection of combustible gasses, such as methane gas, would be desirable. Such a sensor would ideally have the ability to measure gas concentrations in the part per million range (ppm).

SUMMARY OF THE INVENTION

The present invention provides low power combustible gas sensors using a thermocouple design. In one aspect of the invention, a combustible gas sensor is provided. The combustible gas sensor includes: at least one first electrode; at least one second electrode formed from a dissimilar material from the first electrode; and a catalytic material at an active reaction junction between the first electrode and the second electrode, wherein the active reaction junction between the first electrode and the second electrode forms a thermocouple.

In another aspect of the invention, a sensing device is provided. The sensing device includes: multiple sensors each having at least one first electrode, at least one second electrode formed from a dissimilar material from the first electrode, and a catalytic material at an active reaction junction between the first electrode and the second electrode, wherein the active reaction junction between the first electrode and the second electrode forms a thermocouple. The multiple sensors can each include a different catalytic material.

In yet another aspect of the invention, a method for sensing combustible gas is provided. The method includes: providing a combustible gas sensor having: at least one first electrode, at least one second electrode formed from a dissimilar material from the first electrode; and a catalytic material at an active reaction junction between the first electrode and the second electrode, wherein the active reaction junction between the first electrode and the second electrode forms a thermocouple; and measuring a differential voltage at the first electrode upon exposure of the catalytic material to the combustible gas.

A more complete understanding of the present invention, as well as further features and advantages of the present invention, will be obtained by reference to the following detailed description and drawings.

DETAILED DESCRIPTION OF PREFERRED EMBODIMENTS

Provided herein is a sensor that operates at room temperature (i.e., from about 15° C. to about 30° C., and ranges therebetween), is sensitive to combustible gases, and operates in the microwatt (µW) power level. As will be described in detail below, the present sensor operates like a thermocouple using dissimilar metals and a catalytic junction including superficial nanoparticles to catalyze the reaction of low concentrations of combustible gases with oxygen at room temperature. Suitable catalytic nanoparticles include, but are not limited to, platinum (Pt), palladium (Pd), and Ruthenium (Ru).

The term "combustible gas," as used herein, refers for example to hydrocarbon gasses and vapors. This includes, for instance, hydrogen, methane (and other alkanes), methanol, butane, propane, and natural gas.

Figure 1:
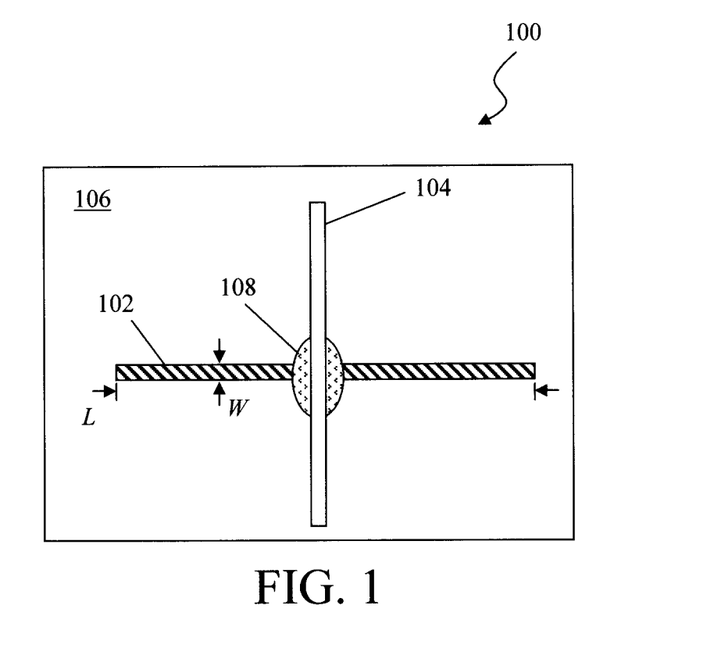
FIG. 1 is a diagram illustrating combustible gas sensor elements according to an embodiment of the present invention.

The elements of the present combustible gas sensor are illustrated in FIG. 1. The present sensor utilizes two dissimilar metals with a gas porous catalytic intermediate surface (as an active region) to break down combustible gas in the presence of oxygen ($O_2$) producing excess amounts of hydrogen ($H_2$), heat and finally the reaction products carbon dioxide ($CO_2$) and water ($H_2O$). According to an exemplary embodiment, the active region of the sensor forms a part of a thermocouple. The evolution of hydrogen and other reaction products temporarily alters the work function of the metals. In addition, heat is evolved from the catalysis process to produce a sensible voltage across the electrodes due to the dissimilar metals used in the construction of the sensor. Specifically, a temperature gradient within a conductor gives rise to a built-in electric field. This is known as the Seebeck or thermoelectric effect. See, for example, Safa Kasap, "Thermoelectric Effects in Metals: Thermocouples," An e-Booklet, pgs. 1-11 (2001), the contents of which are incorporated by reference as if fully set forth herein. Based on the principle of a thermocouple, by employing different electrode materials (i.e., having different Seebeck coefficients) it is possible to read a net voltage difference between the first and second electrodes.

As shown in FIG. 1, the gas sensor 100 includes a first electrode 102 and a second electrode 104 affixed to an inert substrate 106. The first/second electrodes 102 and 104 can be affixed to the inert substrate 106 using, e.g., an adhesive such as an epoxy.

According to an exemplary embodiment, the first electrode 102 and the second electrode 104 are each configured as high-aspect-ratio strips (having a length L and a width W, wherein L>>W), and are affixed to the inert substrate 106 such that the strips are oriented orthogonal to one another, crossing at roughly the midpoint of each strip. See FIG. 1. Further, each strip may be a thin film, e.g., having a thickness of from about 1 nanometer (nm) to about 5 nm, and ranges therebetween.

The first/second electrodes 102 and 104 are formed from dissimilar metals. For instance, according to an exemplary embodiment, one of the (first or second) electrodes is formed from platinum (Pt) or Pt-containing alloys, while the other electrode is formed from palladium (Pd) or Pd-containing alloys. For example, the first electrode 102 is formed from Pt and the second electrode 104 is formed from Pd, or vice versa. In one exemplary embodiment, the Pt electrode (102 or 104) is an alloy of Pt and silver (Ag) to avoid hydrogen embrittlement. By way of example only, the Pt/Ag alloy includes from about 20% to about 25% Ag, and ranges therebetween, and from about 74% to about 79% Pt, and ranges therebetween. Suitable materials for the inert substrate 106 include, but are not limited to, quartz, silica, alumina, aluminum nitride, mica, boron nitride, glass, and combinations thereof.

In this exemplary embodiment, a gas-permeable catalyst is present between the first electrode 102 and the second electrode 104. By gas-permeable it is meant that the catalyst material is itself is configured to be permeable to gasses in the ambient and/or the catalyst is supported on a material that is permeable to ambient gasses. For instance, as will be described in detail below, the catalyst can be composed of one or more layers of catalytic nanoparticles. Such nanoparticle layers are porous and thus permeable to gasses. In that case, the catalyst is preferably also electrically conductive, i.e., electrical contact between the first electrode 102 and the second electrode 104 can be made through the catalyst. As such, the first electrode 102 and the second electrode 104 do not have to directly (physically) contact one another (see FIG. 1) to from a thermocouple since an electrical connection is provided through the catalyst (i.e., catalyst 108). Alternatively, the catalytic material can be supported by a porous, gas-permeable material (such as porous ceramic). In that case, the material surrounding the catalyst might not be electrically conductive, and as such, direct physical/electrical contact between the first electrode 102 and the second electrode 104 is needed to form a thermocouple at the active region.

In the example shown in FIG. 1, a catalytic material 108 is present between the first electrode 102 and the second electrode 104. Specifically, the catalytic material 108 is present at the intersection of the crisscrossed first electrode 102 and second electrode 104. In this instance, the catalytic material 108 makes physical and electrical contact with both the first electrode 102 and the second electrode, but the first electrode 102 does not make direct physical contact with the second electrode 104. In this example, the catalytic material 108 is electrically conductive. The catalytic material 108 is also porous/gas permeable. Thus, the catalytic material 108 in this configuration acts as a gas permeable spacer that prevents the first and second electrodes 102/104 from making direct physical contact with one another. The sensor as configured in FIG. 1 causes a sensible voltage to be generated in the presence of a combustible gas and oxygen.

According to an exemplary embodiment, the catalytic material 108 is formed from one or more layers of nanoparticles. By way of example only, suitable nanoparticles for the sensor include, but are not limited to, Pt nanoparticles (e.g., a Pt nano powder such as platinum black), Pd nanoparticles, and/or Ru nanoparticles. By way of example only, platinum is a strong catalyst for methane gas. See, for example, Singh et al., "Review: An Overview of Recent Development of Platinum-Based Cathode Materials for Direct Methanol Fuel Cells," Int. J. Electrochem. Sci., 9 (July 2014) 5607-5639, the contents of which are incorporated by reference as if fully set forth herein. Palladium is a suitable catalyst for butane gas. See, for example, U.S. Patent Application Publication Number 2013/0072738 by Jung et al., entitled "Supported Catalyst for Direct Dehydrogenation of n-Butane and Preparing Method of Butenes from n-Butane Using the Same," the contents of which are incorporated by reference as if fully set forth herein. Ruthenium or ruthenium in combination with platinum and/or palladium is a suitable catalyst for methanol. See, for example, U.S. Pat. No. 6,429,167 issued to Maeno et al., entitled "Alumina-Supported Ruthenium Catalyst" and U.S. Pat. No. 6,682,837 issued to Gorer entitled "Method for Producing Electricity Using a Platinum-Ruthenium-Palladium Catalyst in a Fuel Cell," the contents of both of which are incorporated by reference as if fully set forth herein. Varying the composition of the catalytic material can tune the sensitivity of the sensor to different gases. Thus, as will be described in detail below, embodiments are contemplated herein where multiple sensors are employed having different catalytic materials, thereby enabling the sensing of different gases.

Layers of (e.g., PT, Pd and/or Ru) nanoparticles are electrically conductive and porous. Thus, as described above, electrical contact between the first and second electrodes 102/104 can be made through the catalytic material 108, without the first and second electrodes 102/104 being in direct physical contact with one another. Ambient gas can permeate the porous catalytic material where, as described above, it is broken down by the catalytic material in a reaction that generates heat. The heat is detected by the thermocouple.

Figure 2:
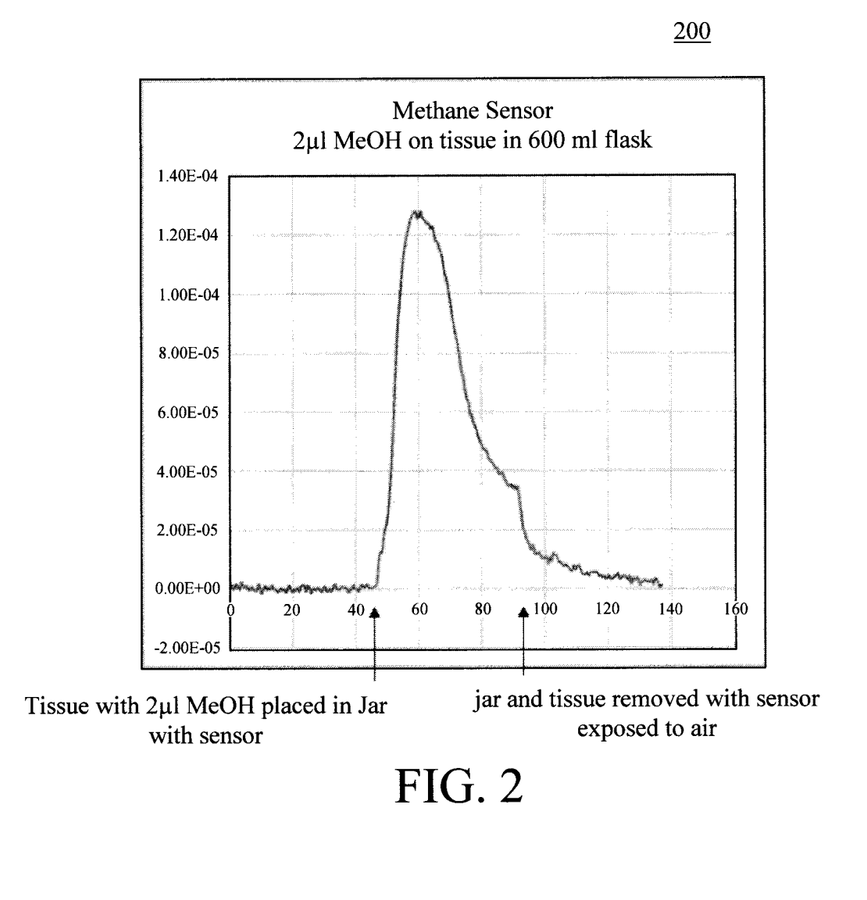
FIG. 2 is a diagram illustrating behavior of the combustible gas sensor of FIG. 1 when placed in a container with a transient concentration of methanol vapor according to an embodiment of the present invention.

Sensor 100 reacts to a variety of combustible hydrocarbons including methanol (MeOH). See, for example, FIG. 2. FIG. 2 illustrates the behavior of sensor 100 in response to a transient concentration of methanol vapor in a container. Voltages in the microvolt to millivolt range were observed in response to the presence of combustible gases such as methane, methanol, etc. In this example, the concentration of methanol vapor varied from about 0 parts per million (ppm) to about 1,000 ppm, and the corresponding sensor output voltages ranged from $1\times10^{-6}$ volts to $1\times10^{-4}$ volts. See FIG. 2. The electrical behavior of the sensor is repeatable and returns to baseline voltage after exposure.

It is notable that while Pt and Pd were chosen as the electrode materials in the above example, other electrode metals can be used to create dissimilar alloys that are useful for the combustible gas sensor including, but not limited to, niobium (Nb), tantalum (Ta), vanadium (V), iron (Fe), nickel (Ni), and tin (Sn). As provided above, Pt nanoparticles, Pd nanoparticles, and/or Ru nanoparticles are all viable options for the catalyst material.

As provided above, during sensing heat is evolved from the catalysis process to produce a sensible voltage across the first/second electrodes due to the dissimilar metals (thermocouple) used in the electrodes. Local temperature effects (such as environmental temperatures depending on the location of the sensor) can, however, contribute a thermoelectric potential to the sensor voltage. Thus, in one alternative embodiment, the above-described sensor is constructed with a reference junction so as to negate the effects of local temperature. See FIG. 3.

Figure 3:
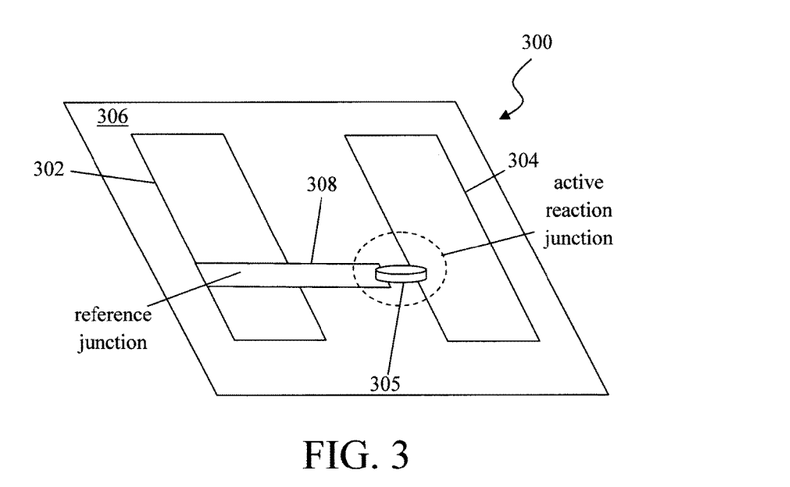
FIG. 3 is a diagram illustrating a combustible gas sensor with a reference junction according to an embodiment of the present invention.

As shown in FIG. 3, sensor 300 includes two identical (i.e., formed from the same material) first electrodes 302 and 304 on an inert substrate 306. These two first electrodes 302 and 304 are parallel to one another, and do not intersect. One second electrode 308 is formed orthogonal to the first electrodes 302 and 304. The second electrode 308 makes electrical and physical contact with first electrode 302 forming a reference junction. The reference junction is akin to a cold junction in a thermocouple circuit (see below), which provides a reference reading away from the heat source. An active reaction (sensing) junction is formed at the other first electrode 304 where catalytic material 305 is in both physical and electrical contact with first electrode 304 and second electrode 308 (however the first electrode 304 and second electrode 308 do not contact one another). Suitable materials for the inert substrate, the first and second electrodes, as well as the catalytic material were provided above.

As also described above, a thermocouple is formed by using first/second electrodes of dissimilar materials. For instance, the first electrodes 302 and 304 can be formed from Pt, and the second electrode 308 can be formed from Pd. The intersection of the first electrode 302 and the second electrode 308 is a reference junction. The active reaction junction can be formed by placing the catalytic material (e.g., Pt, Pd, and/or Ru nanoparticles) in both physical and electrical contact with the first electrode 304 and the second electrode 308.

Electrical contact is made to electrodes 302 and 304 to measure the voltage of the sensor. In practice, this can be achieved by connecting the two electrical contacts to the input of a high impedance instrumentation amplifier 402. See, for example, system 400 FIG. 4. The amplified sensor voltage is then digitized by an analog to digital converter 404 interfaced to a computer 406 for processing, storage, and transmission of the sensor data. An exemplary apparatus that may be configured to serve as computer 406 is described in conjunction with the description of FIG. 8, below.

Referring back to FIG. 3, any of the above described materials may be used as the electrodes employ dissimilar materials. For instance, in an alternate embodiment, the material used for first electrodes 302 and 304 can be switched with that used for second electrode 308. Namely, first electrodes 302 and 304 can be formed from Pd, while Pt forms the bridging second electrode 308. Two electrical contacts are made to the first electrodes 302 and 304 as described above. An additional electrical contact may be made to the bridging second electrode 308 to enable monitoring of both the sensor and reference junction independently if so desired.

Figure 5:
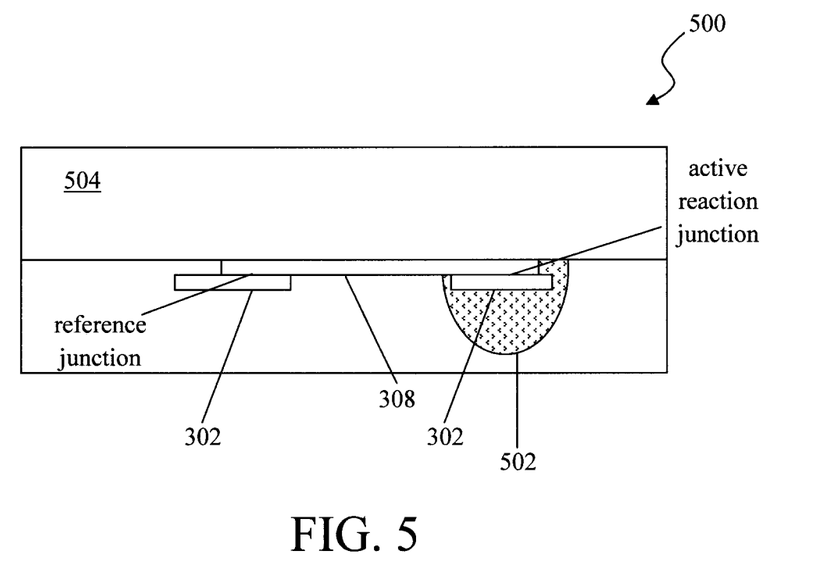
FIG. 5 is a diagram illustrating the active reaction junction having been surrounded with the catalytic material according to an embodiment of the present invention.

Instead of, for example, sandwiching the catalytic layer between the electrodes, it is also possible to surround the junction (of the electrodes) with the catalytic material. See FIG. 5. A reference junction configuration (such as that from FIG. 3) is employed in FIG. 5, and like structures are numbered alike accordingly. For instance, as shown in FIG. 5 the active reaction junction (e.g., at the junction between electrode 304 and (dissimilar) electrode 308) is encapsulated by the catalytic material 502, which is in turn encapsulated by a porous (gas permeable) package 504. Included in the package is the reference junction (e.g., at the junction between electrode 302 and (dissimilar electrode 308). According to an exemplary embodiment, the package 504 is formed from (porous) alumina.

Figure 6:
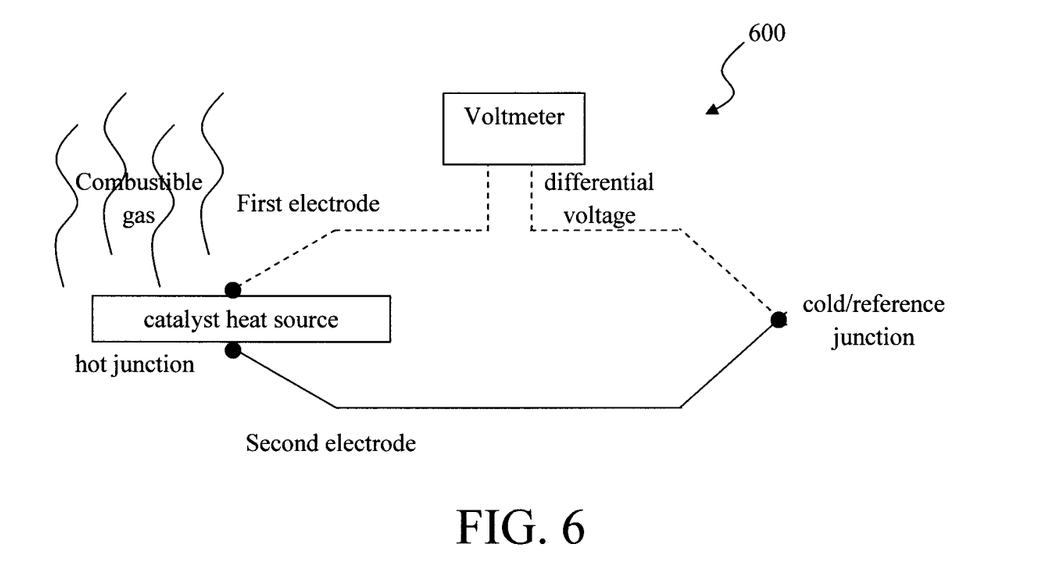
FIG. 6 is a schematic diagram illustrating operation of the present combustible gas sensor according to an embodiment of the present invention.

FIG. 6 is a schematic diagram 600 illustrating operation of the present combustible gas sensor. As shown in FIG. 6, the sensor employs a thermocouple design where, as described above, at least two electrodes (i.e., a first electrode and a second electrode) of dissimilar metals (e.g., Pt and Pd—or other combinations as provided above) are present. A catalytic material (e.g., Pt, Pd, and/or Ru nanoparticles) is present at the 'hot' junction of the electrodes. This catalytic material acts as heat source for the thermocouple circuit. For example, as provided above, heat is a byproduct of the catalysis process when a combustible gas (see FIG. 6) is broken down in the presence of oxygen at the catalytic layer into carbon dioxide ($CO_2$) and water ($H_2O$).

The presence of heat generates a differential voltage in the electrodes that can be detected using a voltmeter. A junction between the electrodes away from the heat source is referred to as a cold or reference junction, since it can provide a measurement remote from the heat source and thus is free from local temperature effects. A cold/reference junction was described, for example, in conjunction with the description of FIG. 3 and FIG. 5, above. This reference allows the exclusion of thermal effects from the signal. It is preferable to place the cold junction proximate to but isolated from the heat source on the same substrate.

It is important that the first/second electrodes only interface with one another at the hot and/or cold junctions, otherwise sensor readings would be faulty. Thus, by constructing the sensor on an inert (i.e., electrically inert, thermo reactively inert, etc.) substrate serves to insulate the electrodes.

Figure 7:
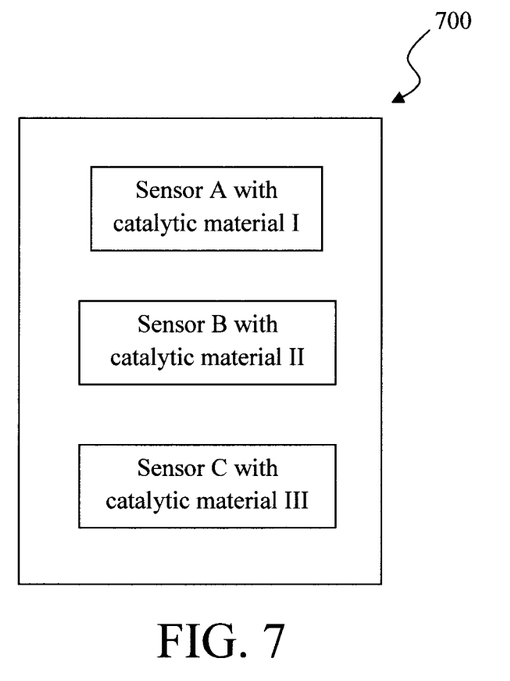
FIG. 7 is a schematic diagram illustrating a multi-sensor device according to an embodiment of the present invention.

As provided above, different catalysts can be employed in the same device to provide sensitivity to different gases. See FIG. 7. The sensing device 700 shown in FIG. 7 includes multiple iterations of the above-described combustible gas sensor, i.e., sensor A, sensor B, sensor C, etc., except that each sensor in device 700 includes a different catalytic material (i.e., catalytic material I, catalytic material II, catalytic material III, etc.). As provided above, suitable catalytic materials for use in accordance with the present sensors include, but are not limited to, Pt nanoparticles, Pd nanoparticles, and/or Ru nanoparticles. Thus, according to an exemplary embodiment, sensing device 700 includes at least one sensor A with Pt nanoparticles as a catalyst, at least one sensor B with Pd nanoparticles as a catalyst, and at least one sensor C with Ru nanoparticles as a catalyst, i.e., as catalytic material I, catalytic material II, catalytic material III, respectively). With different catalytic materials, device 700 will be able to detect a variety of different gases.

Figure 4:
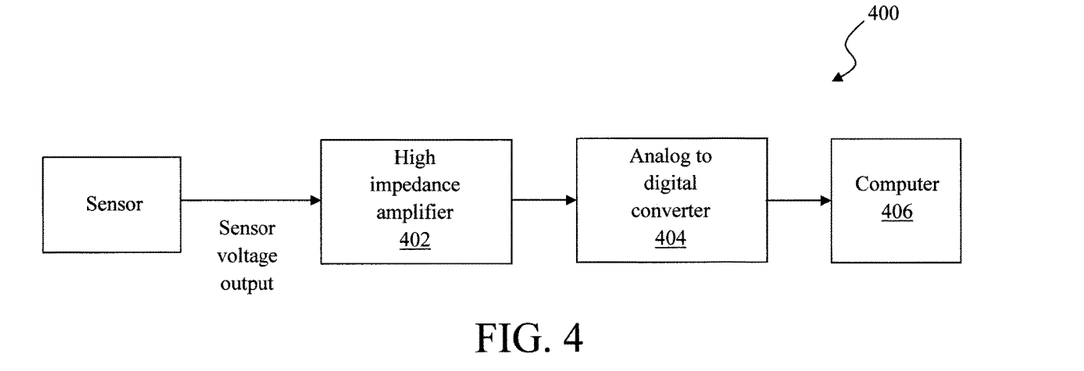
FIG. 4 is a exemplary system for processing sensor data according to an embodiment of the present invention.
Figure 8:
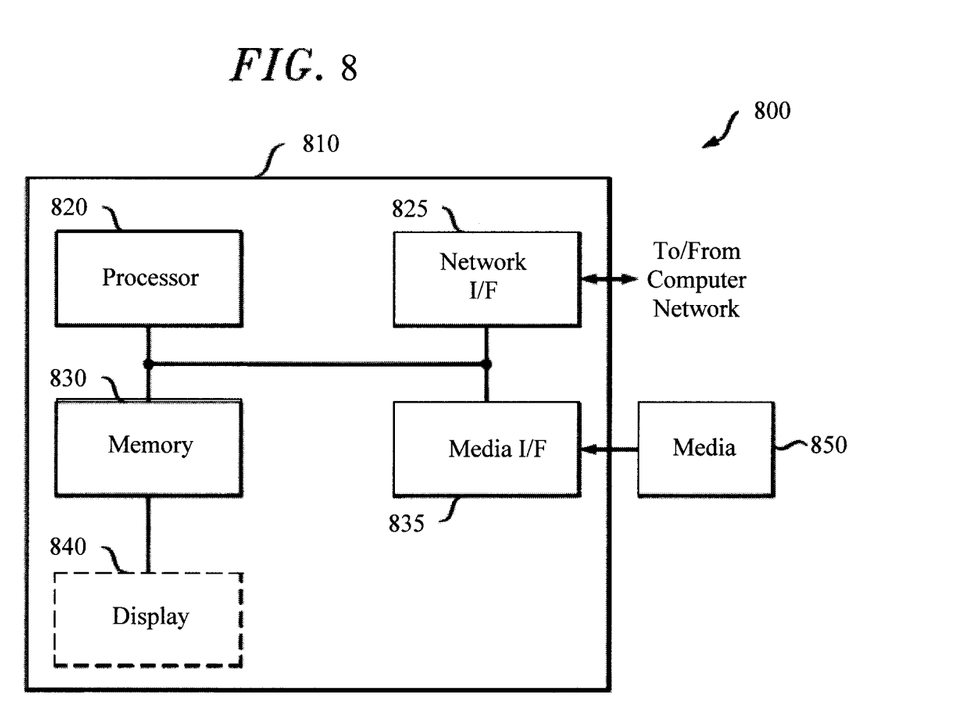
FIG. 8 is a diagram illustrating an exemplary data-processing apparatus according to an embodiment of the present invention.

Turning now to FIG. 8, a block diagram is shown of a data processing apparatus 800 that may be implemented in accordance with the present techniques. For instance, apparatus 800 may be configured to serve as computer 406 in system 400.

Apparatus 800 includes a computer system 810 and removable media 850. Computer system 810 includes a processor device 820, a network interface 825, a memory 830, a media interface 835 and an optional display 840. Network interface 825 allows computer system 810 to connect to a network, while media interface 835 allows computer system 810 to interact with media, such as a hard drive or removable media 850.

Processor device 820 can be configured to implement the methods, steps, and functions disclosed herein. The memory 830 could be distributed or local and the processor device 1020 could be distributed or singular. The memory 830 could be implemented as an electrical, magnetic or optical memory, or any combination of these or other types of storage devices. Moreover, the term "memory" should be construed broadly enough to encompass any information able to be read from, or written to, an address in the addressable space accessed by processor device 820. With this definition, information on a network, accessible through network interface 825, is still within memory 830 because the processor device 820 can retrieve the information from the network. It should be noted that each distributed processor that makes up processor device 820 generally contains its own addressable memory space. It should also be noted that some or all of computer system 810 can be incorporated into an application-specific or general-use integrated circuit.

Optional display 840 is any type of display suitable for interacting with a human user of apparatus 800. Generally, display 840 is a computer monitor or other similar display.

Figure 9:
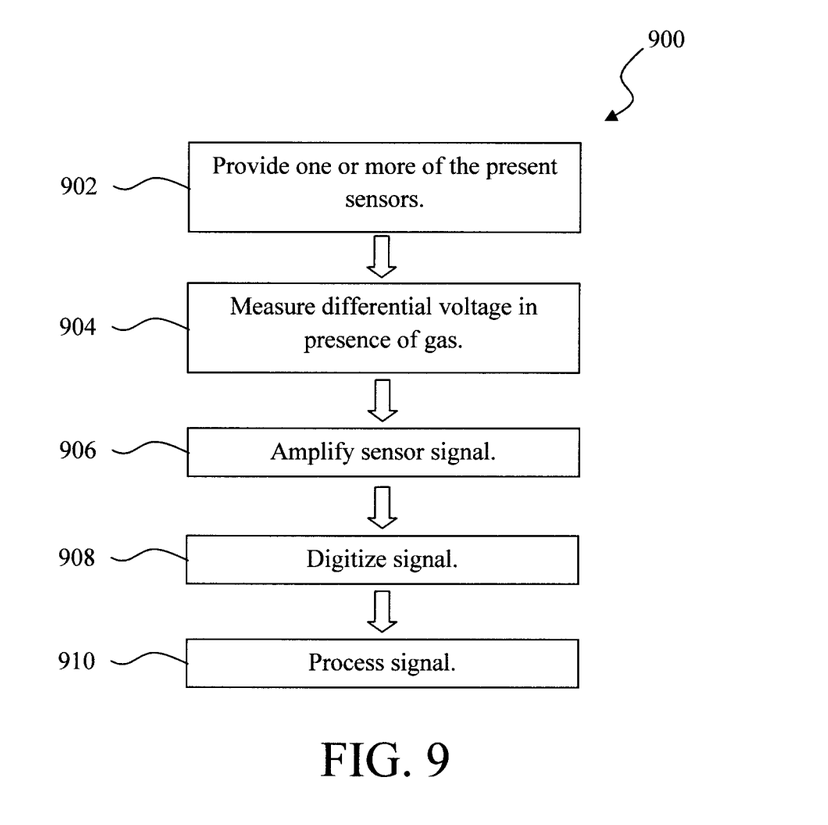
FIG. 9 is a diagram illustrating an exemplary methodology for sensing a combustible gas using the present sensors according to an embodiment of the present invention.

FIG. 9 is a diagram illustrating an exemplary methodology 900 for sensing a combustible gas using the present sensors. In step 902, a sensor or a system of the above-described sensors is provided. Upon exposure of the catalytic material to a combustible gas (which as described above generates heat), in step 904 the differential voltage at the electrodes is measured. Step 904 can be performed using a voltmeter. In step 906, the sensor signal is amplified (for example using an AD8236 instrument amplifier available from Analog Device, Norwood, Mass.). In step 908, the output of the amplifier is connected to an analog to digital converter which digitizes the (amplified signal). See also FIG. 4. The digitized signal can then be further processed, analyzed, etc. in step 910 using, e.g., a computer for data processing.

A variety of different electrode and catalyst configurations are contemplated herein. For instance, as described in conjunction with the description of FIG. 1 above, the basic components of the present sensor 100 include first and second electrodes 102/104 and a catalytic material 108 at an active reaction junction between the first and second electrodes 102/104. The active reaction junction between the first and second electrodes 102/104 forms a thermocouple junction. According to the present techniques, at the active reaction junction, the first and second electrodes may not have direct physical contact with one another (as in the example shown in FIG. 1 where electrical contact between the first and second electrodes 102/104 is provided via the catalyst 108) or, alternatively, there may be both direct physical and electrical contact between the first and second electrodes at the active reaction junction. In the former case, the catalytic material is both porous and electrically conductive. In the latter case, the catalytic material can be supported/contained in a non-electrically conductive, porous material. Each of these exemplary configurations will now be further described by way of reference to FIGS. 10 and 11.

Figure 10:
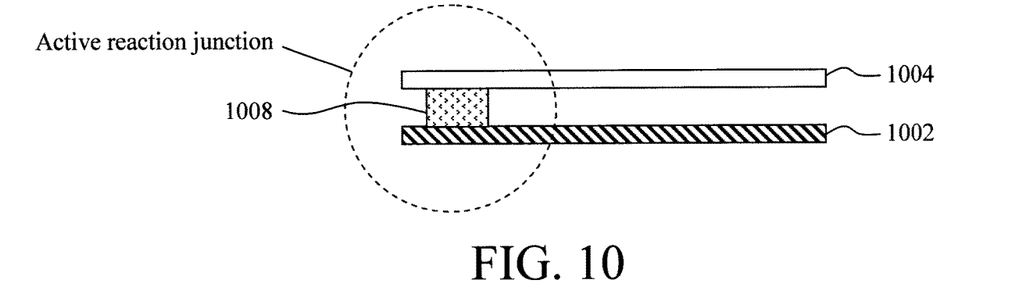
FIG. 10 is a diagram illustrating an exemplary configuration of the present combustible gas sensor wherein the active reaction junction includes the first and second electrodes making contact via a porous, electrically conductive catalyst according to an embodiment of the present invention.

FIG. 10 illustrates the exemplary configuration where the first and second electrodes (in this example given reference numerals 1002/1004, respectively) make electrical contact through the catalytic material 1008. Specifically, in the same manner as described above, the catalytic material 1008 is present at an active reaction junction between the first electrode 1002 and second electrode 1004. The active reaction junction between the first electrode 1002 and second electrode 1004 forms a thermocouple. In this example, the first electrode 1002 and the second electrode 1004 do not make direct physical contact with one another. However, the catalytic material 1008 (which is both porous and electrically conductive) makes direct physical contact with both the first electrode 1002 and the second electrode 1004. Thus, continuity between the first electrode 1002 and the second electrode 1004 is provided by the catalytic material 1008. As provided above, suitable porous, electrically conductive catalysts include, but are not limited to, layers of Pt, Pd, and/or Ru nanoparticles.

In this example, the first electrode 1002 is electrically, thermally, and mechanically contacted to the porous catalytic material 1008. The porous catalytic material 1008 is similarly contacted electrically, thermally, and mechanically to the second electrode 1004. The assembly forms a combination of thermoelectric junctions that behaves operationally as if first electrode 1002 and second electrode 1004 were directly in contact. The porous catalytic material 1008 allows gas to permeate and react thereby raising the junction temperature. As described above, the junction temperature is sensible as a thermoelectric voltage across first electrode 1002 and second electrode 1004.

Figure 11:
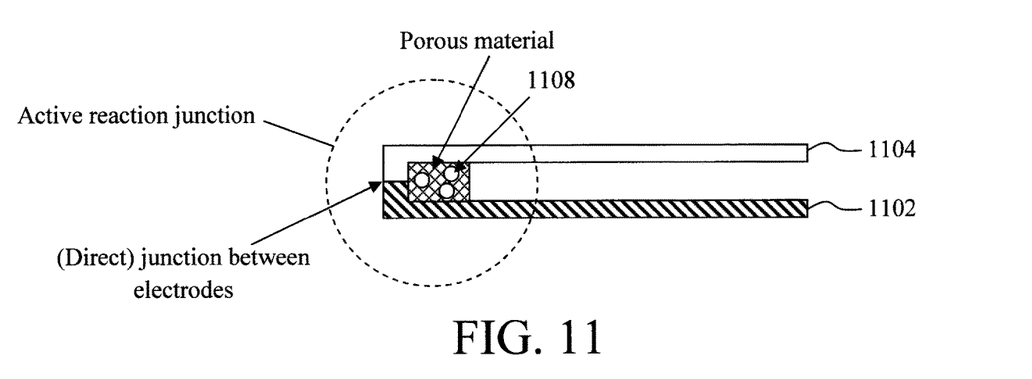
FIG. 11 is a diagram illustrating an exemplary configuration of the present combustible gas sensor wherein the active reaction junction includes the first and second electrodes in direct physical and electrical contact with one another and with a non-electrically conductive catalyst according to an embodiment of the present invention.

As highlighted above, the catalyst may be supported by a porous, non-electrically conductive material. In that case, the active reaction junction can include the first and second electrodes (in this example given reference numerals 1102/1104, respectively) in direct physical (and electrical) contact with one another at the active reaction junction. See FIG. 11. As shown in FIG. 11, as above, the catalytic material 1108 is present at an active reaction junction between the first electrode 1102 and second electrode 1104. The active reaction junction between the first electrode 1102 and second electrode 1104 forms a thermocouple. In this example, the catalytic material 1108 is supported by a non-electrically conductive, porous material. Specifically, as shown in FIG. 11 the catalytic material 1108 is dispersed within a porous (but not electrically-conductive) material. Accordingly, in order to insure electrical contact, the first electrode 1102 and second electrode 1104 are in direct physical, and electrical contact with one another, forming a direct (thermocouple) junction between the electrodes. According to an exemplary embodiment, the catalyst includes Pt, Pd, and/or Ru nanoparticles, and the porous, non electrically-conductive material includes porous ceramic, sintered particles, lithographically patterned nanowires, pressed nanowires, and/or any other formed porous structures known in the art.

In this example, both the first electrode 1102 and the second electrode 1104 are thermally and mechanically contacted to the porous, non-electrically conductive material. The first electrode 1102 is contacted electrically, thermally and mechanically to the second electrode 1104. The assembly forms a thermocouple between the first electrode 1102 and the second electrode 1104. The porous, non-electrically conductive material allows gas to permeate and react with the catalytic material 1108 thereby raising the temperature of the material. The porous, non-electrically conductive material is in thermal contact with the thermocouple junction between the electrodes. The reaction of combustible gasses with the catalytic material 1108 in the porous, non-electrically conductive material thereby heats the thermocouple junction and is sensed based on a thermoelectric voltage response to the junction temperature.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A combustible gas sensor, comprising:
at least one first electrode;
at least one second electrode formed from a dissimilar material from the at least one first electrode;
an inert substrate to which the at least one first electrode and the at least one second electrode are affixed; and
a catalytic material at an active reaction junction between the at least one first electrode and the at least one second electrode, wherein the active reaction junction between the at least one first electrode and the at least one second electrode forms a thermocouple, wherein the at least one first electrode and the at least one second electrode crisscross one another, wherein the catalytic material is present at an intersection of the at least one first electrode and the at least one second electrode, and wherein the at least one first electrode and the at least one second electrode are each configured as strips disposed orthogonal to one another on the inert substrate, and cross one another at about a midpoint of each of the strips.

2. The combustible gas sensor of claim 1, wherein either the at least one first electrode or the at least one second electrode comprises a material selected from the group consisting of: platinum and palladium.

3. The combustible gas sensor of claim 1, wherein either the at least one first electrode or the at least one second electrode comprises a platinum-silver alloy, and wherein the platinum-silver alloy comprises from about 20% to about 25%, and ranges therebetween silver, and from about 74% to about 79%, and ranges therebetween platinum.

4. The combustible gas sensor of claim 1, wherein the catalytic material is electrically conductive and porous.

5. The combustible gas sensor of claim 4, wherein the catalytic material is selected from the group consisting of: platinum nanoparticles, palladium nanoparticles, rhodium nanoparticles, and combinations thereof.

6. The combustible gas sensor of claim 4, wherein the at least one first electrode is in direct physical contact with the catalytic material, wherein the at least one second electrode is in direct physical contact with the catalytic material, and wherein the at least one first electrode and the at least one second electrode are not in direct physical contact with one another at the active reaction junction.

7. The combustible gas sensor of claim 1, wherein the catalytic material is dispersed within a porous, non-electrically conductive material.

8. The combustible gas sensor of claim 1, wherein the inert substrate comprises a material selected from the group consisting of: quartz, silica, alumina, aluminum nitride, mica, boron nitride, glass, and combinations thereof.

9. The combustible gas sensor of claim 1, wherein the strips each have a thickness of from about 1 nanometer to about 5 nanometers, and ranges therebetween.

10. The combustible gas sensor of claim 1, wherein the catalytic material is disposed between the at least one first electrode and the at least one second electrode such that the catalytic material physically contacts both the at least one first electrode and the at least one second electrode.

11. The combustible gas sensor of claim 1, wherein the catalytic material encapsulates the at least one first electrode and the at least one second electrode.

12. A sensing device, comprising:
multiple sensors each comprising at least one first electrode, at least one second electrode formed from a dissimilar material from the at least one first electrode, an inert substrate to which the at least one first electrode and the at least one second electrode are affixed, and a catalytic material at an active reaction junction between the at least one first electrode and the at least one second electrode, wherein the active reaction junction between the at least one first electrode and the at least one second electrode forms a thermocouple, wherein the at least one first electrode and the at least one second electrode crisscross one another, wherein the catalytic material is present at an intersection of the at least one first electrode and the at least one second electrode, and wherein the at least one first electrode and the at least one second electrode are each configured as strips disposed orthogonal to one another on the inert substrate, and cross one another at about a midpoint of each of the strips.

13. The sensing device of claim 12, wherein the multiple sensors each comprise a different catalytic material.

14. The sensing device of claim 13, wherein a first sensor in the sensing device comprises platinum nanoparticles as a catalytic material, a second sensor in the sensing device comprises palladium nanoparticles as a catalytic material, and a third sensor in the sensing device comprises ruthenium nanoparticles as a catalytic material.

15. A method for sensing combustible gas, the method comprising:
providing a combustible gas sensor, comprising: at least one first electrode, at least one second electrode formed from a dissimilar material from the at least one first electrode, an inert substrate to which the at least one first electrode and the at least one second electrode are affixed; and a catalytic material at an active reaction junction between the at least one first electrode and the at least one second electrode, wherein the active reaction junction between the at least one first electrode and the at least one second electrode forms a thermocouple, wherein the at least one first electrode and the at least one second electrode crisscross one another, wherein the catalytic material is present at an intersection of the at least one first electrode and the at least one second electrode, and wherein the at least one first electrode and the at least one second electrode are each configured as strips disposed orthogonal to one another on the inert substrate, and cross one another at about a midpoint of each of the strips; and measuring a differential voltage at the at least one first electrode upon exposure of the catalytic material to the combustible gas.

16. The method of claim 15, wherein the combustible gas is selected from the group consisting of: hydrogen, methane, methanol, butane, propane, and natural gas.

* * * * *